US012618656B2

(12) United States Patent　　　(10) Patent No.:　US 12,618,656 B2

Guest　　　　　　　　　　　　　(45) Date of Patent:　　　May 5, 2026

(54) METHOD OF COMMUNICATION

(71) Applicant: DETNET SOUTH AFRICA (PTY) LTD, Johannesburg (ZA)

(72) Inventor: Ian William Guest, Johannesburg (ZA)

(73) Assignee: DETNET SOUTH AFRICA (PTY) LTD, Johannesburg (ZA)

( * ) Notice: Subject to any disclaimer, the term of this patent is extended or adjusted under 35 U.S.C. 154(b) by 0 days.

(21) Appl. No.: 19/110,229

(22) PCT Filed: Jul. 26, 2023

(86) PCT No.: PCT/ZA2023/050041

§ 371 (c)(1),
(2) Date: Mar. 10, 2025

(87) PCT Pub. No.: WO2024/059885

PCT Pub. Date: Mar. 21, 2024

(65) Prior Publication Data

US 2026/0085919 A1　　Mar. 26, 2026

(30) Foreign Application Priority Data

Sep. 14, 2022　(ZA) ................................. 2022/10178

(51) Int. Cl.
　*F42D 1/05*　　　(2006.01)
　*F42C 15/42*　　(2006.01)
　*H04W 72/0446*　(2023.01)
(52) U.S. Cl.
　CPC ................ *F42D 1/05* (2013.01); *F42C 15/42* (2013.01); *H04W 72/0446* (2013.01)
(58) Field of Classification Search
　CPC ... F42D 1/05; F42D 1/055; F42D 3/04; F42C 15/42

(Continued)

(56) References Cited

U.S. PATENT DOCUMENTS 6,851,369 B2　2/2005　Hummel et al.
7,848,078 B2 *　12/2010　Hummel ................... F42D 3/04
　　　　　　　　　　　　　　361/247

(Continued)

FOREIGN PATENT DOCUMENTS

EP　　2115384 B1　3/2015
EP　　3042148 B1 *　4/2018　............. F42D 1/055

(Continued)

OTHER PUBLICATIONS

International Search Report for PCT/ZA2023/050041, mailed Oct. 19, 2023, 3 pages.

(Continued)

*Primary Examiner* — James S Bergin
(74) *Attorney, Agent, or Firm* — NIXON & VANDERHYE, PC

(57)　　　　　ABSTRACT

A method of communicating in a blast system which includes the steps of transmitting timing signals from a master transceiver to a plurality of local transceivers, in response, at each local transceiver, defining a succession of micro-slots and calculating a size of a respective bin which is associated with each micro-slot, transmitting a packet from the master transceiver, at each local transceiver calculating a uniform random value, identifying the bin in which the uniform random value is located and during the micro-slot which is associated with the identified bin, if no transmission of a reply signal from any other local transceiver is detected, in response to the packet transmitting a reply signal from the local transceiver to the master transceiver.

7 Claims, 3 Drawing Sheets

(58) Field of Classification Search
USPC ........................................ 102/206, 215, 217
See application file for complete search history.

(56) References Cited

U.S. PATENT DOCUMENTS

| | | | | |
|---|---|---|---|---|
| 7,929,270 B2 * | 4/2011 | Hummel | ................... | F42D 3/04 |
| | | | | 361/249 |
| 8,385,042 B2 * | 2/2013 | McCann | ................... | F42D 1/05 |
| | | | | 361/247 |
| 9,366,518 B2 * | 6/2016 | Guyon | .................... | F42D 1/055 |
| 11,874,098 B2 * | 1/2024 | Muller | ...................... | F42D 1/05 |
| 2008/0307993 A1 * | 12/2008 | Chan | ....................... | F42B 3/113 |
| | | | | 102/214 |
| 2009/0193993 A1 | 8/2009 | Hummel et al. | | |
| 2015/0007740 A1 * | 1/2015 | Guyon | ................... | F42D 1/055 |
| | | | | 102/215 |

FOREIGN PATENT DOCUMENTS

| | | | | | |
|---|---|---|---|---|---|
| WO | WO-0159401 A1 * | 8/2001 | ............... | F42D 1/05 |
| WO | WO-2024059885 A1 * | 3/2024 | ............... | F42D 1/05 |

OTHER PUBLICATIONS

Written Opinion of the ISA for PCT/ZA2023/050041, mailed Oct. 19, 2023, 6 pages.

* cited by examiner

METHOD OF COMMUNICATION

This application is the U.S. national phase of International Application No. PCT/ZA2023/050041 filed Jul. 26, 2023, which designated the U.S. and claims priority to ZA Patent Application No. 2022/10178 filed Sep. 14, 2022, the entire contents of each of which are hereby incorporated by reference.

BACKGROUND OF THE INVENTION

This invention relates to a method of communicating, using wireless techniques, in a blast system which includes a blast controller and a large number of detonator assemblies which are deployed at respective boreholes positioned at defined locations in a blast site.

In this type of wireless-based blast system, each detonator assembly includes a transmitter/receiver which can be positioned on ground and which is connected via conductors to a detonator arrangement in a borehole, which is charged with explosive material. The transmitter/receiver is operative to communicate with the blast controller which is at a remote location and to initiate the detonator arrangement in response to a fire signal from the blast controller.

To enhance productivity and efficiency of operation, the number of detonator assemblies which are included in the blast system and which are under the control of the blast controller can be of the order of several thousand. A signal from the blast controller can be sent via a master transceiver for various operative purposes on a broadcast basis to all the detonator assemblies. Additionally a signal, from the blast controller, which is destined for a single detonator assembly, can be distinguished through the use of an identifier, in the blast controller signal, which is uniquely associated with the targeted detonator assembly. Correct receipt by the blast controller, of a reply signal from a given detonator assembly, is confirmed by transmission of an acknowledgement signal from the master transceiver to the transmitter/receiver at the given assembly.

Reply signals are transmitted to the master transceiver by the transmitter/receiver arrangements at the various detonator assemblies at defined times. It is however possible for some of these reply signals to be transmitted more or less simultaneously. This results in what is referred to as a collision. The blast controller is then unable to receive useful information, for data in a reply signal from one detonator assembly is mixed with and cannot be distinguished from data in a reply signal from another detonator assembly. To avoid or reduce the incidence of collisions the times at which the detonator assemblies can transmit their reply signals can be staggered, but this results in increased latency.

When a collision is detected the detonator assemblies, from which the colliding reply signals originated, do not receive confirmatory signals from the blast controller. In this way the respective detonator assemblies are prompted to retransmit the reply signals. However if the reply signals from these assemblies are retransmitted in the next available time slot or frame they will again collide.

The invention is concerned with reducing the likelihood of collisions of the aforementioned kind thereby to reduce the time taken to set up and execute a blasting sequence.

SUMMARY OF THE INVENTION

The invention provides a method of communicating in a blast system which includes a blast site, a blast controller, a master transceiver which is operable under the control of the blast controller, and a plurality of detonator assemblies which are respectively deployed at the blast site, each detonator assembly respectively including a processor, a unique identifier which is stored in memory associated with the processor and a local transceiver which is operable under the control of the processor, wherein the method comprises the steps of:

(a) transmitting timing signals from the master transceiver to the local transceivers thereby to define a succession of frames each of a known time duration and to synchronise operation of the local transceivers of the plurality of detonator assemblies with the operation of the master transceiver, (b) dividing each frame into a plurality of slots each of which has a respective predetermined duration, each slot including a respective plurality of micro-slots each of which has a respective defined duration, (c) for each slot assigning a respective value (T) to each of a number of micro-slots selected from said plurality of micro-slots in the slot, (d) calculating a size (BS) of a bin which is respectively associated with each selected micro-slot, wherein the bin size (BS) is dependent on the value (T) assigned to said selected micro-slot, (e) transmitting a packet from the master transceiver to one or more local transceivers, wherein said packet includes data, information or commands which are linked to at least one local transceiver, whereby said local transceiver is prompted to send a respective reply signal to the master transceiver, the reply signal including the unique identifier of the respective detonator assembly, and at said local transceiver, (f) using a uniform random number generator to calculate a uniform random value, (g) identifying a bin in which said uniform random value is located, (h) identifying the micro-slot which is associated with said identified bin, (i) during a defined interval in the duration of said identified micro-slot, enabling the respective local transceiver to be operative to detect transmission of a reply signal from any other local transceiver, and (j) if the detection in step (i) is negative, transmitting said reply signal, responsive to the packet, from the respective local transceiver to the master transceiver.

If the detection in step (i) is positive then according to the method of the invention steps (f) to (i) are repeated.

The number of micro-slots in each slot may be variable, and change from slot to slot. Thus the number of micro-slots (A) in slot (B) may be different from the number of micro-slots (M) in slot (C). A and M may be varied. Additionally, from frame to frame, the number of slots per frame may be varied and the number of micro-slots per slot may vary as aforesaid.

For each micro-slot the size, (BS), of the bin (step (d)) may be given by the expression $k^T$ where T is the value assigned to the micro-slot. k is an empirically determined quantity based inter alia on characteristics of the blast system.

T may be a numerical value. The micro-slots may be numbered in a numerical sequence consistent with the positions of the micro-slots in the respective slot.

BRIEF DESCRIPTION OF THE DRAWINGS

The invention is further described by way of example with reference to the accompanying drawings in which.

DESCRIPTION OF PREFERRED EMBODIMENT

Figure 1:
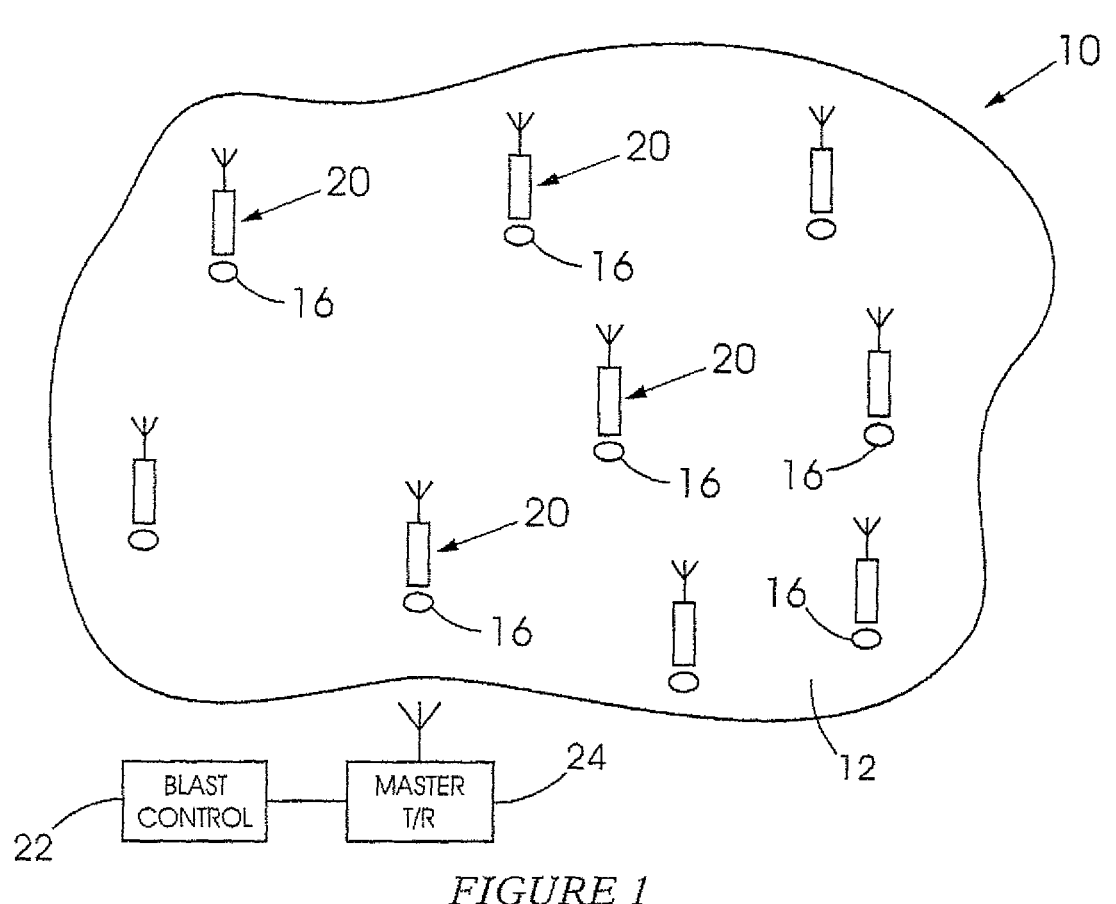
FIG. 1 schematically depicts a wireless-based blast system according to the invention.

FIG. 1 of the accompanying drawings schematically illustrates a blast system 10 which includes a blast site 12 in which are formed a plurality of boreholes 16 at respective positions which are determined using an appropriate blasting protocol.

The blast system 10 includes a plurality of detonator assemblies 20 each of which is deployed at a respective borehole 16. Blasting is carried out under the control of a blast controller 22 which includes a master transceiver 24.

Figure 2:
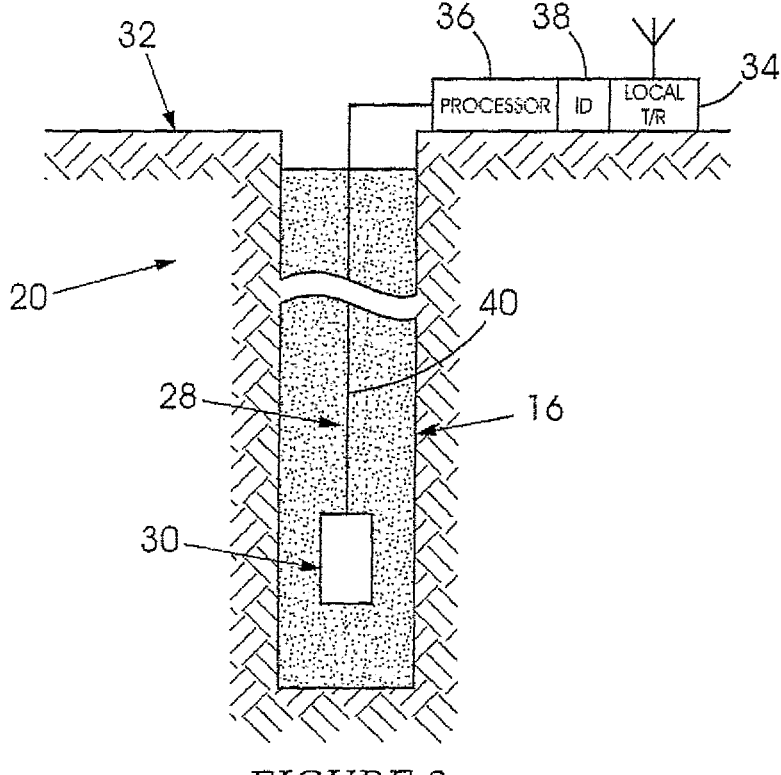
FIG. 2 illustrates a borehole in the blast system in which a detonator assembly is deployed.

FIG. 2 illustrates a borehole 16 which is charged with an explosive material 28. A detonator arrangement 30, which forms part of the detonator assembly 20 associated with the borehole, is exposed to the explosive material. At ground level 32 the detonator assembly 20 includes a local transceiver 34. The detonator assembly 20 also includes a processor 36 which, according to requirement can be included in the detonator arrangement 30 or can be positioned, as shown, on a surface at the ground level 32 together with the local transceiver 34. An identifier 38 which is uniquely associated with the detonator assembly 20 is stored in memory in the processor 36. The components at the ground level 32 are connected to the detonator arrangement 30 by conductors 40.

Signals from the master transceiver 24 are sent wirelessly to the local transceivers 34 associated with the various detonator assemblies. In the return direction reply signals go from the local transceivers to the master transceiver. Each reply signal includes the respective unique identifier 38 of the detonator assembly from which the reply signal was transmitted. Two-way communication is thus established between the blast controller 22 and each detonator assembly 20. This enables status and safety checks to be carried out, delay times to be assigned to the detonator assemblies using control information at the blast controller and, ultimately, arm and fire signals to be sent from the blast controller 22 via the master transceiver to the detonator assemblies to cause ignition thereof.

A signal which is broadcast from the blast controller 22 can reach all of the detonator assemblies at the blast site 12 although, if necessary repeaters can be used to ensure that full coverage is achieved. If a signal from the blast controller is destined for a single detonator assembly then the signal includes the unique identifier 38 of that detonator assembly so that a direct one-to-one connection is established between the blast controller and the targeted detonator assembly.

A large blast system includes several thousand detonator assemblies. Reply signals from the detonator assemblies sent in response to a signal from the master transceiver must be spaced apart from one another in intervals separated on a time basis to avoid collisions. If two or more reply signals are received at the master transceiver, more or less simultaneously, then data in the reply signals cannot be reliably extracted. When a collision occurs the master transceiver does not send acknowledgement of receipt of reply signals and, in this way within a preset time period, the respective detonator assemblies, from which the reply signals originated, are made aware that those reply signals were not successfully received. The affected detonator assemblies are programmed then to retransmit the respective reply signals which previously collided. However if these reply signals were to be retransmitted simultaneously in a following allocated interval they would again collide.

In a large blast system the time which is taken to transmit control signals from the blast controller to the detonator assemblies and then to receive satisfactory reply signals from the detonator assemblies, in a sequential process, can be substantial. For example if the blast system includes ten thousand detonator assemblies and the average time taken to generate and transmit a reply signal is 0.5 seconds then the minimum duration of a setup period would be of the order of 5000 seconds i.e. about 80 to 90 minutes. To reduce the duration of this time period the reply signals should be sent within shortened time intervals but in that event, the likelihood of collisions between the reply signals from the detonator assemblies increases. Conversely, the latency of the system is increased if longer time slots are used for the transmission of the reply signals, in order to avoid collisions.

Figures 3, 4, 5:
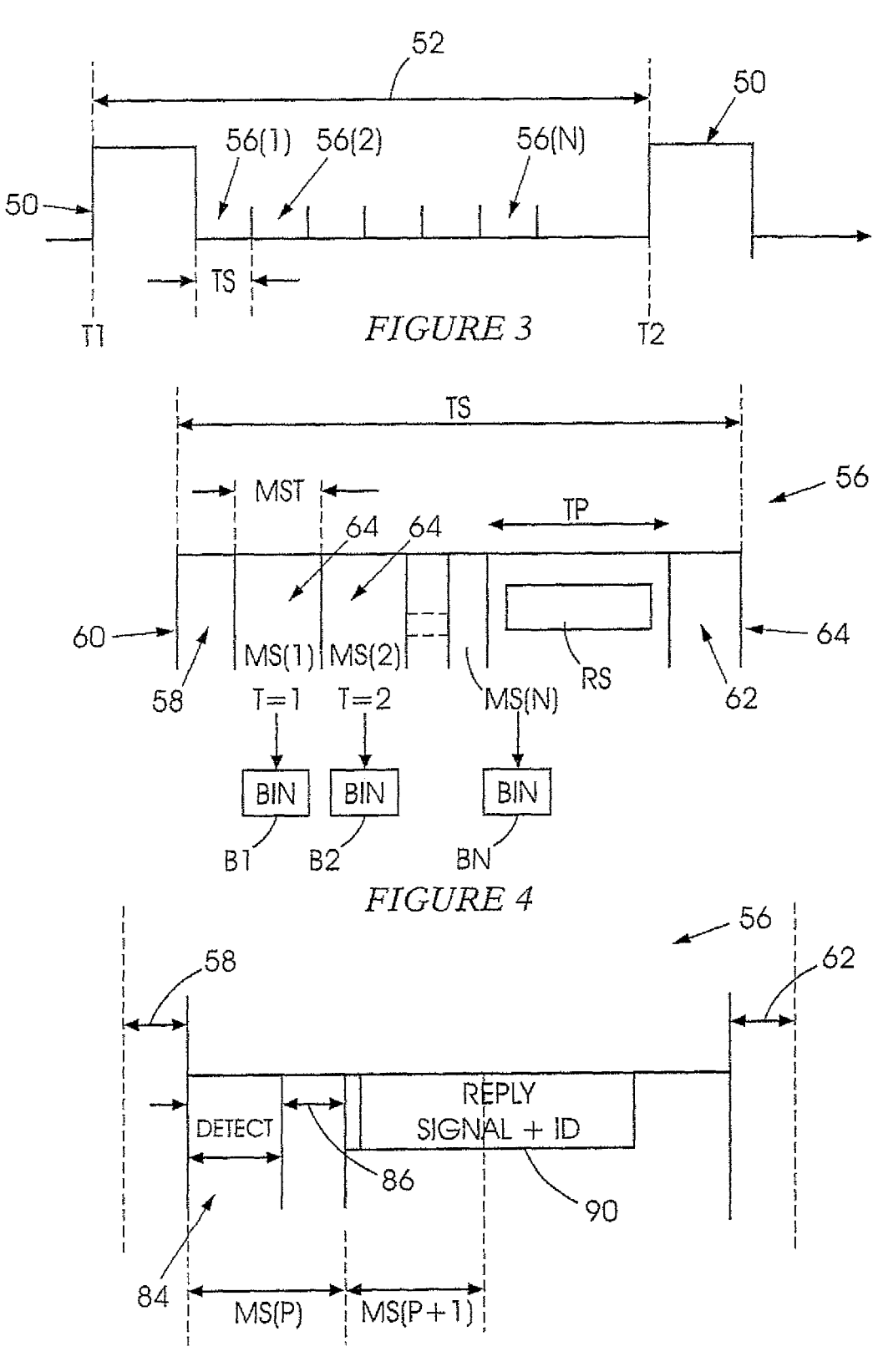
FIG. 3 depicts a time frame which is a parameter in a communication method, according to the invention, used at a blast site.
FIG. 4 shows a possible time-based composition of a slot which is one of a number of similar slots included in the time frame of FIG. 3.
FIG. 5 depicts how, on a time basis, reply signals from detonator assemblies in the blast system of FIG. 1 are controlled to minimize the incidence of collisions between the reply signals.

Referring to FIG. 3 in the method of the invention the master transceiver 24, under the control of the blast controller 22, transmits at a time T1 and on a broadcast basis, timing signals 50 to the local transceivers 34 thereby to define a succession of frames 52 each of which has a defined time duration extending from T1 to T2.

The timing signals 50 are received by the various transceivers 34 and this allows the operation of the local transceivers, and hence the operation of the associated detonator assemblies, to be synchronized with the operation of the master transceiver 24.

In each frame 52 the timing signal 50 is followed by a number of slots 56(1), 56(2) . . . 56(N). Each slot 50 has a respective defined time duration TS. The time duration of the slots may be equal, or may vary.

FIG. 4 illustrates a representative slot 56 of duration TS. A portion 58 of the time slot 56 at a leading end 60 and a portion 62 at a trailing end 64 of the slot are not utilized for signal transmission but are provided to prevent overlapping of signals in the operation of the blast system which could occur if timing requirements are not precisely effected.

Starting at the end of the portion 58 a number of microslots 66, marked as MS(1), MS(2) . . . MS(N), are defined. Each micro-slot 66 has the same duration MST. Between the last micro-slot MS(N) and the portion 62 a time period TP is available during which a reply signal RS from a local transceiver can be sent to the master transceiver 24.

A respective value T is assigned to each micro-slot 66. In this embodiment of the invention T is a numeric value which is the number of the micro-slot after the portion 58. Thus the numeric value 1 is assigned to the micro-slot MS(1); 2 is assigned to the micro-slot MS(2); 3 is assigned to the micro-slot MS(3), etcetera. This is exemplary and non-limiting. Respective bins B1, B2 . . . BN are linked to the micro-slots with the size (BS) of each bin B being dependent on the value of T (1, 2, 3 etc.) which has been assigned to the associated micro-slot. The expression "bin" is used in a notional sense in that it denotes a mechanism whereby a number of values can be grouped together.

By way of example, the size of the bin B for a particular micro-slot is given by the expression BS=bin size=$k^T$ where T is the aforesaid value assigned to that micro-slot, and k is a value, chosen by an operator based on experience and subsequent performance, for the blast system, and is a function of data relating to physical and functional aspects such as the number (n) of detonator assemblies in the blast system, the duration (d) of each time period allowed for the transmission of a reply signal from a local transceiver to the master transceiver (in FIG. 4 this is the value TP), and the desired latency (l) of the blast system. In general terms k=f(n,d,l).

As the bin size BS is a power function of the bin number T (BS=$k^T$) the number of values in each of the successive bins, respectively associated with the micro-slots 66, increases exponentially through the series of micro-slots MS(1), MS(2) . . . MS(N).

It falls within the scope of the invention to vary the number of micro-slots (66) per slot (56), from slot to slot, and from frame to frame.

Figure 6:
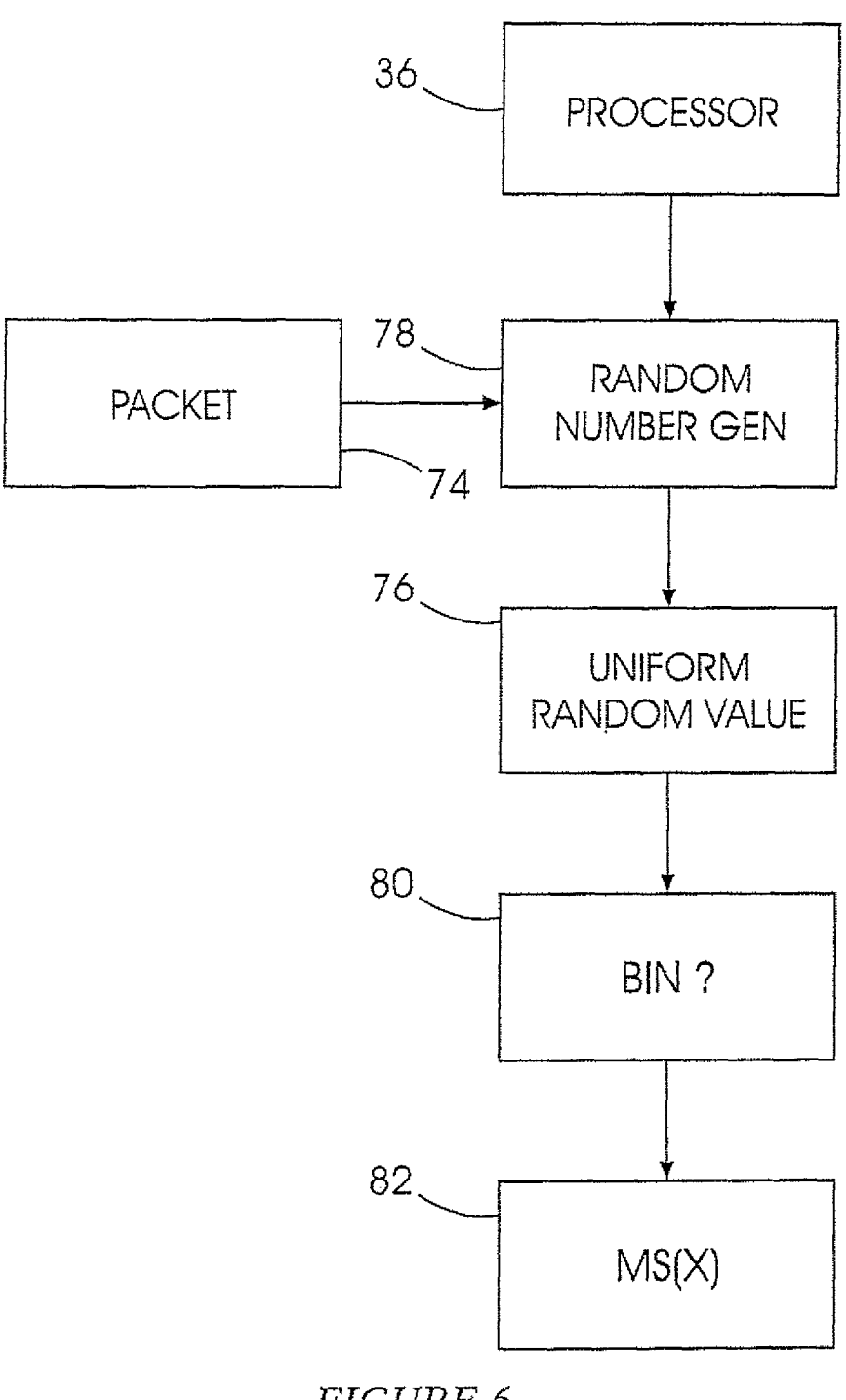
FIG. 6 is a flowchart representation of steps in the communication method of the invention.

FIG. 6 depicts the transmission of a packet 74 from the master transceiver 24 to one or more of the local transceivers 34 at the blast site 10. The packet 74 contains information, data or commands for the detonator assemblies which are linked to the targeted local transceivers. Depending on operational requirement the packet 74 can be sent on a broadcast basis to all of the detonator assemblies, or use can be made of the unique identifiers 38, or group identifiers or other techniques, to direct the packet 74 to one or more particular detonator assemblies or groups of assemblies. Transmission of the packet 74 normally takes place within the time duration (T2–T1) of a frame 52 (see FIG. 3).

Upon reception of the packet 74 the relevant detonator assemblies 20 are prompted, in response, to send respective reply signals to the master transceiver 24. If these reply signals were to be sent immediately, or at some time in the next available frame 52, collisions would occur. To address this aspect the respective processor 36 at each detonator assembly 20 calculates, for the slot, a uniform random value 76 using a random number generator 78. The processor 36 then identifies the bin (step 80) in which the uniform random value 76 is located and, thereafter, in a step 82 determines or identifies the micro-slot MS(X), in that slot, to which the bin was linked as described hereinbefore with reference to FIG. 4, where 1≤X≤N.

As the bin size increases with the respective micro-slot number, the leading or first micro-slot MS(1) is less likely to be identified and the last micro-slot MS(N) is more likely to be identified.

In respect of any given detonator assembly 20, FIG. 5 shows a slot 56 and successive first and second micro-slots MS(P) and MS(P+1) which are included in a number of micro-slots between the non-used time portions 58 and 62 (also referred to as pre-deadtime and post-deadtime). During the duration of the first micro-slot MS(P), the local transceiver 34 of the given detonator assembly 20 is placed in a reception mode and is only used during a detect period 84 to implement a listen-before-talk (LBT) mechanism, so as to detect transmission of a reply signal 90 from any of the other local transceivers 34, which reply signal may reach the local transceiver in question. If the detection is negative, i.e. no other local transceiver is transmitting (detected), then the period 84 is followed by a period 86 during which the transceiver 34 is switched from a receive mode to a transmission mode. At, or shortly after, the beginning of the next micro-slot MS(P+1) in the slot 56, a reply signal 90, which includes the respective unique identifier 38 of the detonator assembly in question, is transmitted by the local transceiver 34 in response to the packet from the master transceiver 24. That reply signal 90 would normally be sent in the time period allocated for the micro-slot MS(P+1).

If the detection is positive, i.e. during the period 84 transmission of a reply signal from another local transceiver is detected then, similarly to what has been described with reference to FIG. 6, the random number generator 78 again is used to generate a uniform random value 76 whereafter a bin is identified in which the random value 76 is located. A micro-slot MS(X), to which the bin is linked, is identified and the LBT mechanism described in connection with FIG. 5 is implemented for the duration of the period 84 for that micro-slot. If no transmission of a reply signal from another local transceiver is detected, then transmission of a reply signal 90 from the detonator assembly in question can take place (responsive to the packet 74).

The invention is based on the use of a time backoff technique which lowers the reply signal transmission rate from the local transceivers to an optimal value at which the effect of collisions is addressed. The determining factor is the expression $k^N$ where N is the number of micro-slots in a frame 56 (i.e. the maximum value of T in the example in which the value of T varies in a sequential manner). For each of the micro-slots 66 in a slot 56 the size (BS) of the respective bin is determined. A uniform random value is generated for that slot and the bin which contains the uniform random value is determined. The micro-slot linked to that bin is then identified. A reply signal is then transmitted. This sequence is repeated until receipt of the transmission of a reply signal, from the local transceiver in question, is acknowledged by the master transceiver 24.

If a transmission of a reply signal takes place then during a period which is related to the maximum time period required for an acknowledgement of a receipt signal from the master transceiver 24, the respective local transceiver 34 does not again attempt to transmit a reply signal.

The positive reception of a reply signal at the master transceiver/blast controller is confirmed by the transmission of an acknowledgement signal, which contains the unique identifier 38 associated with the originating transceiver 34, and consequently no further attempt would then be made by that transceiver 34 to transmit a message to the master transceiver 24.

If no acknowledgement of receipt of a reply signal is received by the local transceiver 34, within the maximum allowable response time, then the local transceiver 34 would recommence the aforementioned process and would again transmit a reply signal to the master transceiver 24.

The invention claimed is:

1. A method of communicating in a blast system (10) which includes a blast site (12), a blast controller (22), a master transceiver (24) which is operable under the control of the blast controller (22), and a plurality of detonator assemblies (20) which are respectively deployed at the blast site (12), each detonator assembly (20) respectively including a processor (36), a unique identifier (38) which is stored in memory associated with the processor (36), and a local transceiver (34) which is operable under the control of the processor (36), wherein the method comprises the steps of:

(a) transmitting timing signals (50) from the master transceiver (24) to the local transceivers (34) thereby to define a succession of frames (52) each of a known time duration (T2–T1) and to synchronise operation of the local transceivers (34) of the plurality of detonator assemblies (20) with the operation of the master transceiver (24), (b) dividing each frame (52) into a plurality of slots (56) each of which has a respective predetermined duration (TS), each slot (56) including a respective plurality of micro-slots each of which has a respective defined duration, (c) for each slot assigning a respective value (T) to each of a number of micro-slots (66) selected from said plurality of micro-slots in the slot, (d) calculating a size (BS) of a bin (B) which is respectively associated with each selected micro-slot (66), wherein the bin size (BS) is dependent on the value (T) assigned to said selected micro-slot, (e) transmitting a packet (74) from the master transceiver (24) to one or more local transceivers (34), wherein said packet (74) includes data, information or commands which are linked to at least one local transceiver (34) whereby said local transceiver (34) is prompted to send a respective reply signal (90) to the master transceiver (24), the reply signal (90) including the unique identifier (38) of the respective detonator assembly (20), and at said local transceiver (34), (f) using a uniform random number generator (78) to calculate a uniform random value (76), (g) identifying a bin (B) in which said uniform random value (76) is located, (h) identifying the micro-slot (66) which is associated with said identified bin (B), (i) during a defined interval (84) in the duration of said identified micro-slot (66), enabling the respective local transceiver (34) to be operative to detect transmission of a reply signal from any other local transceiver, and (j) if the detection in step (i) is negative, transmitting said reply signal (90) responsive to the packet (74) from the respective local transceiver (34) to the master transceiver (24).

2. The method of claim 1 wherein, if the detection in step (i) is positive, steps (f) to (i) are repeated.

3. The method of claim 1 which includes at least one of the following steps: varying the number of micro-slots in each slot; and varying the number of slots per frame.

4. The method of claim 1 wherein in step (d) the size (BS) of the respective bin for a micro-slot (66) is given by $BS=k^T$ where T is the value assigned to the micro-slot (66), and where k is dependent on the number (n) of detonator assemblies in the blast system, the duration (d) of each time period allowed for the transmission of a reply signal from a local transceiver to the master transceiver, and the desired latency (1) of the blast system.

5. The method of claim 1 wherein, at each detonator assembly (20), during the duration of a first micro-slot the respective local transceiver (34) is placed in a reception mode for a given period (84) to implement a listen-before-talk mechanism, so as to detect transmission of a reply signal from any of the other local transceivers.

6. The method of claim 5 wherein, if said detection is negative, the given period (84) is followed by a period (86) during which the respective local transceiver (34) is switched from the reception mode to a transmission mode, and the reply signal (90) is transmitted by the local transceiver (34) to the master transceiver (24).

7. The method of claim 5 wherein, if said detection is positive, steps (f) to (i) are again implemented.

* * * * *